United States Patent [19]

Creps

[11] Patent Number: 4,746,444
[45] Date of Patent: May 24, 1988

[54] PREVENTION OF CHIP BUILD-UP IN FILTRATION EQUIPMENT

[75] Inventor: John L. Creps, Rudolph, Ohio

[73] Assignee: Henry Filters, Inc., Bowling Green, Ohio

[21] Appl. No.: 11,534

[22] Filed: Feb. 6, 1987

[51] Int. Cl.$^4$ .................................... B01D 17/035
[52] U.S. Cl. ............................. 210/803; 210/804; 210/806; 210/220; 210/221.2
[58] Field of Search ............ 209/19, 133, 138, 139 R, 209/140, 141, 154, 162, 163, 164–169; 210/702, 710, 723, 726, 738, 767, 800, 803, 804, 806, 220, 221.1, 221.2, 525

[56] References Cited

U.S. PATENT DOCUMENTS

| | | | |
|---|---|---|---|
| 4,081,338 | 3/1978 | Golovoy | 210/708 |
| 4,194,972 | 3/1980 | Weintraub et al. | 210/707 |
| 4,366,069 | 12/1982 | Dudrey et al. | 210/788 |
| 4,492,636 | 1/1985 | Burke | 210/705 |

Primary Examiner—Frank Sever
Attorney, Agent, or Firm—Nixon & Vanderhye

[57] ABSTRACT

An apparatus for and method of preventing the build-up of particulate waste, such as machining chips, on the surface of a body of machining coolant having a filtration apparatus immersed therein. Machining chips of light metals, such as aluminum, magnesium, titanium, and the like, generally have a large surface area and, particularly in the presence of tramp oil, tend to accumulate on the surface of a body of coolant. The present invention proposes bubbling air or other suitable gas upwardly through the body of coolant, the air bubbles increasing in volume as they rise through the coolant body and bursting at the surface to wet the machining chips with coolant, so that the chips sink into the body of coolant for removal at the chip-coolant separating means immersed in the body of coolant. The air can be introduced intermittently or continuously through a perforate conduit which, in a preferred embodiment of the invention, is incorporated into the separating means.

6 Claims, 3 Drawing Sheets

PREVENTION OF CHIP BUILD-UP IN FILTRATION EQUIPMENT

This invention relates to a method of and an apparatus for preventing the build-up of chips of relatively light materials, such as aluminum, magnesium, titanium and the like in filtration apparatus, such as a filter unit for a large central machine coolant system. In the machining of relatively light metals, such as aluminum, the chips are quite large, have a large exposed surface area for their weight, and tend to accumulate on the surface of the body of machine coolant in a filtration tank having chip-coolant separating means immersed in the body of coolant. The present invention proposes the injection of air, or other suitable gas, into the tank at a lower region of the tank, and the air then bubbles up through the liquid in the tank to agitate the coolant. The bubbles expand as they rise in the tank and then they burst at the surface, so that the coolant will wet the chips. The wetted chips will sink into the coolant for separation at the immersed separation means.

BACKGROUND AND BRIEF DESCRIPTION OF THE INVENTION

The present invention is particularly adapted to the prevention of chip build-up in the central coolant tank of a large central coolant system for the machining of light metals, such as aluminum, magnesium, titanium and the like. The machining chips from objects being machined of such metals are generally large, are of curled or convolute configuration, and have a large surface area relative to their weight. Further, the presence of any tramp oil in the system will inhibit adequate wetting of the chips by the coolant.

As a result, the chips merely accumulate on the surface of the pool of coolant maintained in the filtration tank, and a layer of such chips may build up to a substantial depth on the surface of the liquid in the tank. The presence of any tramp oil in the coolant, particularly at the pool surface, inhibits or prevents wetting of the chips with the coolant and increases the chip build-up. The presence of such a buoyant layer of chips interferes materially with the normal filtration operation, since the floating chips can become entangled in a drag-out conveyor for the tank, thus jamming the conveyor, and the chip layer can hang up on any overflow weirs or other portions of the filtration mechanism located at or near the surface of the tank. If a skimmer conveyor is provided for the surface of the tank, the chip build-up also will interfere with the operation of the skimmer conveyor, again causing jamming and interferece with the normal filtration operation.

The present invention proposes a simple solution to the problem of chip build-up, namely the injection of a gas, preferably air, into the body of liquid in the filtration tank so that the air bubbling up through the liquid will agitate the liquid beneath the chip layer and through the depth of the chip layer. As the bubbles rise through the liquid, the hydrostatic pressure on each bubble decreases progressively, so that the bubbles become larger as they travel upwardly through the liquid. The bubbles then burst when exposed to the liquid-air interface, and the coolant from the burst bubbles and other coolant agitated by the bubbles will wet the chips. The chips, once adequately wet with the coolant, will sink through the body of coolant for removal during normal chip-coolant separation, both by the conventional drag-out conveyor and at the filtration apparatus immersed in the tank.

Surprisingly, it has been found that the upward bubbling of the air through the coolant does not cause any substantial frothing of the coolant, nor does it cause any undue loss of the coolant due to evaporation. Further, it has been found that the air bubbling technique of the present invention will adequately wet the chips so that they sink despite the presence of tramp oil in the body of coolant. The present invention prevents or minimizes the effect of such tramp oil.

In one embodiment of the present invention, the air is simply introduced into the tank through a series of pipes located adjacent the bottom of the tank, with the air bubbling upwardly through the coolant. In another embodiment of the present invention, the air conduits are integrated into the filtration mechanism, so that no extraneous structure is necessary to perform the bubbling function. Further, such integral air conduits are distributed throughout the tank at the locations where the chip-coolant separation is accomplished.

The air may be continuously introduced in relatively small volumes or, preferably, the air is introduced periodically on a predetermined schedule related to the filtration function. For example, where the filtration mechanism is a cylindrical drum which is rotated against a scraping mechanism for the removal of accreted contaminants from the surface of the drum, the air is introduced each time that the drum is indexed and as a consequence of drum indexing. Alternatively, a separate timing device may be used to periodically inject the air. It has been found that injecting the air periodically by either means conserves air while providing a sufficient flow of coolant-agitating bubbles, and the non-wetted layer of chips on the surface of the coolant in the tank can either be minimized or eliminated completely by such periodic injection.

Thus, it will be seen that the present invention provides an extremely simple, effective and inexpensive method for preventing the build-up of chips on the surface of the coolant in the filtration tank.

THE PREFERRED EMBODIMENTS OF THE INVENTION

Figure 1:
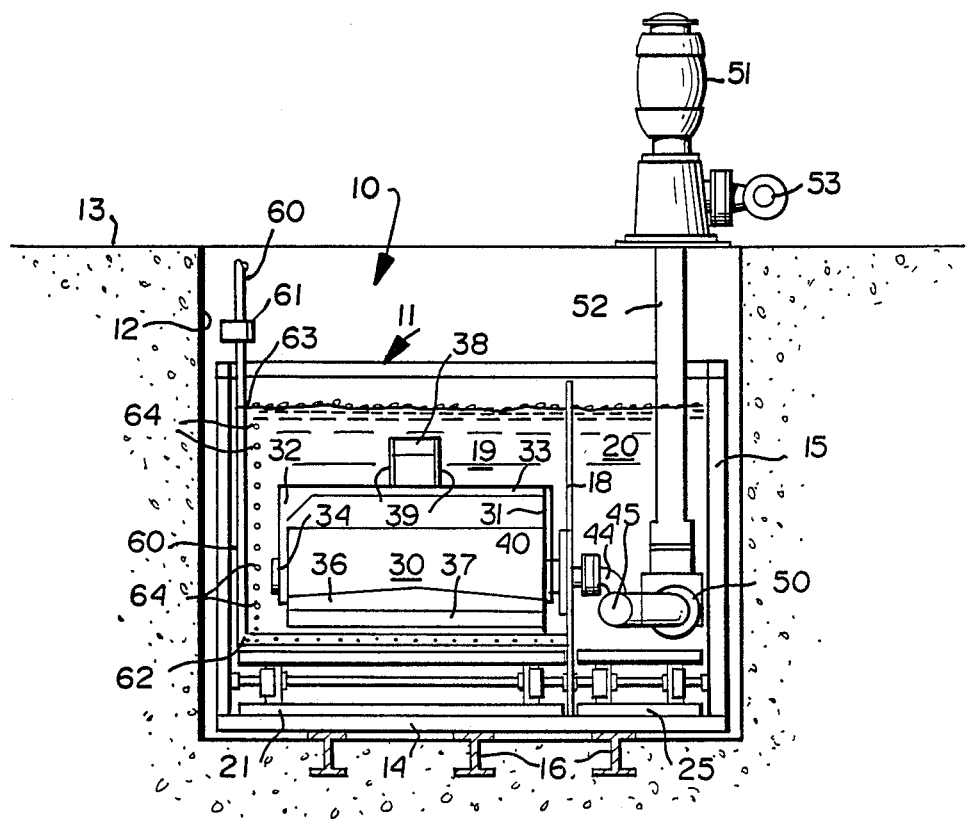
FIG. 1 is a vertical sectional view of a first embodiment of the present invention capable of carrying out the method of the present invention.
Figure 2:
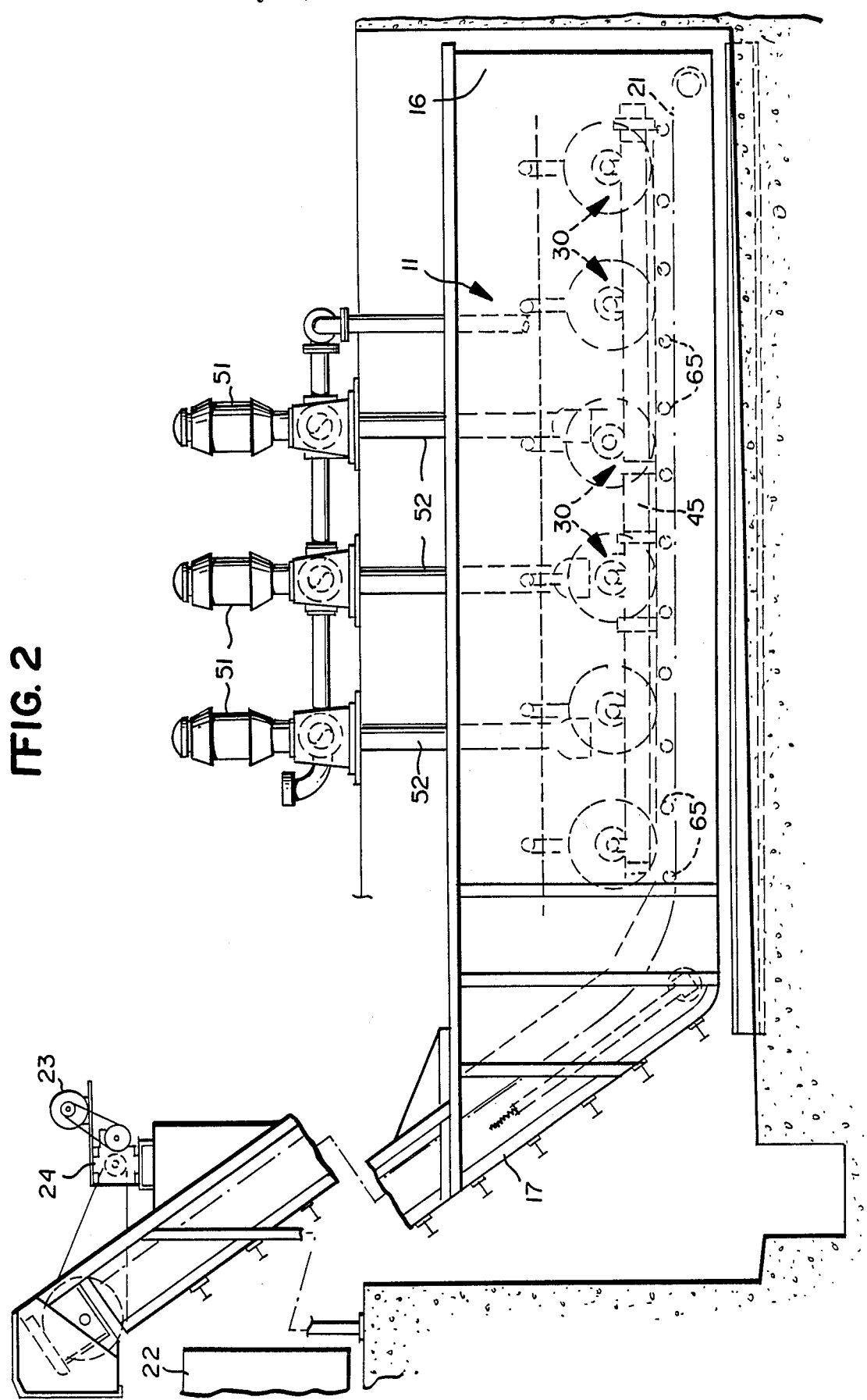
FIG. 2 is a vertical longitudinal section of a second embodiment of the present invention.
Figure 3:
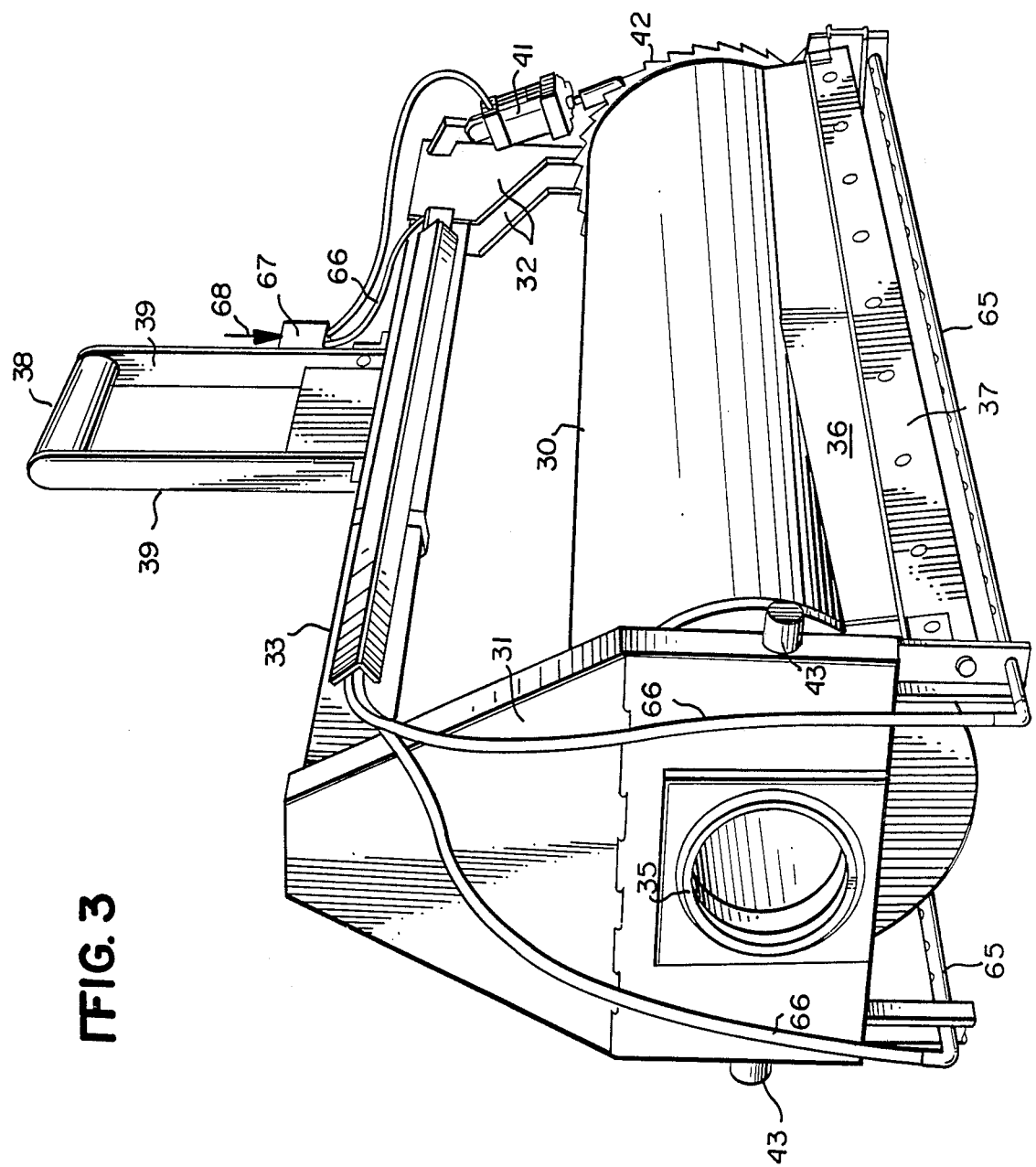
FIG. 3 is an enlarged perspective view of a portion of the embodiment shown in FIG. 2 of the drawings.

In the drawings, FIGS. 1, 2 and 3 show the same overall filtration appratus provided with two different versions of the invention.

As shown in FIGS. 1–3 of the drawings, reference numeral 10 refers generally to a coolant tank indicated generally at 11 and disposed within a pit 12 located beneath the floor level 13 of a typical machining plant. The pit is covered by open-mesh flooring (not shown). The tank 10 is generally of rectangular cross-sectional configuration and includes a bottom wall 14 supported on I-beams 16 embedded in the floor of the pit and side walls 15 projecting upwardly from the bottom wall 14. A vertical end wall 16 (FIG. 2) and an inclined end wall 17 (FIG. 2) completes the tank.

Disposed within the tank 11 is a vertical wall 18 which subdivides the tank into a dirty liquid space 19 and clean liquid space 20. Disposed in the dirty liquid tank 19 is a dragout conveyor 21 transversely substantially coextensive with the tank and having a lower reach which traverses the inner surface of the bottom wall 14 and which extends upwardly over the inclined end wall 17 to dump into a tote box or container 22. The slat-type conveyor 21 is trained about suitable sprockets and is driven by a motor 23 and a gear box 24 at an appropriate speed. A second, somewhat smaller conveyor 25 is positioned in the clean portion 20 of the tank, and this conveyor also discharges into the tote box 22 and is driven by the motor 23 or by a separate motor, as desired.

Positioned in the dirty liquid portion 19 of the tank 11 is a series of filtration drums indicated generally at 30 and illustrated in detail in FIG. 3 of the drawings. As shown in FIG. 3, each of the filtration drums 30 is journalled for rotation in a carrier comprising end plate 31 and end supports 32 which are joined by a longitudinal beam 33 overlying the drum and axially parallel to the drum. The drum is provided with an annular end seal 35 corotatable with the drum and journalled in a mounting box 40 mounted on the vertical wall 18 dividing the tank sections 19, 20. The drum is rotatable about its longitudinal axis against a scraper blade 36 carried by a lower scraper blade mounting plate 37, and each individual drum can be elevated from the tank 11 by means of an upper hoisting yoke comprising a longitudinal bight portion 38 carried by vertical arms 39. The drum is rotated by an air-actuated cylinder 41 which engages a notched driving plate 42 rotatable with the drum and best shown in FIG. 3.

The drums thus are each supported on the central wall 18 by clamping means (not shown) engageable with horizontal clamp pins 43 and are cantilevered from the wall 18 into the dirty liquid tank section 19. Dirty coolant flows through the periphery of the drums, with the dirt in the coolant accreting on the exterior surface of the drum to be removed by the scraper blade 36 as the drum is rotatably indexed by the cylinder 41. The interior of the drum opens into the clean liquid tank 20 to an aperture in the wall 18 and through the end seal 35 of the drum, and the drums each communicate through individual conduits 44 with a header conduit 45 which is vented to the intake of a series of pumps 50 driven by overhead motors 51 and discharging through vertical discharge conduits 52 individual to the pumps into a common discharge line 53 through which the coolant is returned to the central coolant system.

All of the above structure is common to both embodiments of the invention and reference is made to FIGS. 1, 2 and 3 for a visual representation of these common elements.

In that embodiment of the invention shown in FIG. 1 of the drawings, an air line 60 communicating with a suitable source of compressed air (not shown) and having a control valve 61 interposed therein depends downwardly into the tank for communication with a plurality of horizontal perforate pipe sections indicated generally at 62. Preferably, the pipe sections 62 are interposed between adjacent overlying filtration drums 30, although they may be aligned with the individual drums, if desired. Compressed air introduced through the line 60 and each of the perforate pipe sections 62 will be released into the liquid coolant within the tank section 19, and this air will bubble upwardly through the liquid coolant toward the coolant surface indicated at the level 63.

The bubbles 64 will expand as they travel upwardly through the liquid coolant, due to the progressively lessening hydrostatic head to which they are subjected, and these bubbles will burst at the surface 63. Both the upward bubble movement and the bursting of the bubbles will agitate the coolant, particularly at and near the surface 63. In the event that there are any large chips present at the surface 63, the bursting of the bubbles will wet the chips with coolant liquid and the chips, once wetted, will sink into the body of liquid coolant to be filtered by the filtration apparatus, including the drums 30 and the drag-out conveyor 21.

Any large chips falling through the liquid coolant will either be filtered from the coolant at the drums or the chips will fall upon the drag-out conveyor 21 to be carried out of the tank by the conveyor. Periodically, the drums are indexed rotationally against the scrapers 36 to scrape the accreted chips from the drum surface, and these chips will also fall upon the drag-out conveyor to be carried out thereby.

In that version of the invention shown in FIGS. 2 and 3, the perforate air pipes are integrated into the drum support structure. More specifically, as viewed in FIG. 3, the supporting framework for the drum includes the front support plate 31, the beam 33 and the rear support plates 32, and the scraper support element 37. Also forming a part of the frame are perforate pipes 65 extending longitudinally between the front and rear frame elements of the drum support structure and communicating through hose lines 66 with a control valve 67 which actuates the indexing cylinder 41. As shown, this indexing cylinder 41 is single-acting, with a return spring, and receives compressed air from a source (not shown) but indicated schematically at 68. Preferably, the air lines 66 for the pipes 65 receive air periodically under the control of the valve 67. Depending upon the type and design of the valve 67, air is introduced into the pipes 67 upon each actuation of the cylinder 41, or at all times when the cylinder 41 is not being energized by the air, or on the basis of a timing mechanism completely independent of the actuation of the cylinder 41. In any event, air from the same supply source is supplied both to the pipes 65 and to the cylinder 41, and the air supply to the pipes 65 preferably is periodic.

The operation of the second embodiment of the invention illustrated in FIGS. 2 and 3 is identical to that illustrated in FIG. 1 of the drawings and above described in detail. The air will rise from the pipes 65 through the body of liquid coolant to burst at the surface 63 in the same manner, and the bursting of the bubbles together with the agitation of the coolant by the upward passage of the bubbles therethrough will wet the chips with coolant, so that they sink for filtration at the drums 30 and to be conveyed out of the tank by the conveyor 25.

I claim:

1. In a method for operating a chip separating system including a tank containing dirty liquid having relatively light, but heavier than the liquid, machining chips floatable on the liquid surface, chip-liquid separation means immersed in the dirty liquid and means adjacent the bottom of the tank for removing chips from the tank, the improvement including preventing a build-up of the chips on the liquid surface by sinking the floating chips to adjacent the bottom of the tank, comprising the steps of causing the floating chips to sink to adjacent the bottom of the tank by periodically injecting a gas under pressure into the dirty liquid adjacent the bottom of the tank, bubbling the gas upwardly through the liquid to form bubbles adjacent the liquid surface sufficiently large to burst at the liquid surface in proximity to the floatable chips, and wet the surfaces of the floating chips utilizing the liquid agitated by the bursting air bubbles to cause the surface wetted chips to sink below the liquid surface into the liquid and removing the sunken chips from the tank.

2. A method of preventing a build-up of relatively light machining chips on the surface of a body of machining coolant overlying a submerged separating means at which the chips can be separated from the coolant, comprising the steps of:
 (1) causing the chips to sink from the surface of the coolant by injecting air into the body of coolant at a plurality of locations beneath the surface of the coolant body;
 (2) forming by said air injection a series of air bubbles which rise through the body of coolant and which expand as they rise to burst at the coolant surface to agitate the coolant such that the upward movement of the air bubbles and their bursting at the coolant surface wet the chips thereby to submerge the chips below the coolant body surface into the coolant body; and
 (3) separating the submerged chips from the coolant at the separating means.

3. In a method for operating a filtration system having a tank containing dirty liquid having relatively light, floatable particulate contaminant on the liquid surface including heavier than the liquid machining chips, a filter element immersed in the dirty liquid and means for removing contaminants from the tank, the method of preventing a build-up of the chips on the liquid surface by sinking the chips to adjacent the bottom of the tank, comprising the steps of causing the floating chips to sink to adjacent the bottom of the tank by injecting a gas under pressure into the tank beneath the liquid surface, bubbling the gas upwardly through the liquid to form bubbles adjacent the liquid surface sufficiently large to agitate the liquid and wet the surfaces of the floating chips to cause the surface wetted chips to sink into the liquid, and removing the sunken chips from the tank.

4. The method of removing contaminants and preventing a build-up of relatively light particulate contaminants on the surface of a body of liquid overlying a separating means at which the contaminants are separated from the liquid, the particulate contaminants being heavier than the liquid, comprising the steps of:
 (1) causing the contaminants to sink below the liquid surface by periodically injecting air into the body of liquid at a plurality of locations beneath the surface of the liquid
 (2) forming upon each injection a series of air bubbles which rise through the liquid and which expand as they rise to burst at the liquid surface to wet the surfaces of the contaminants with liquid thereby causing the surface wetted comtaminants to sink into the liquid; and
 (3) separating the sunken contaminants from the coolant at the separating means.

5. A filtration system for the removal of relatively light metal machining waste floating on the surface of liquid coolant disposed in a tank by submerging the waste below the surface, comprising a filter element carried by a frame for periodic movement, a pneumatic cylinder for periodically moving said filter element, a scraper carried by the frame, the element and scraper being immersed in the tank of liquid coolant, means for causing the floating waste to sink from the surface of the coolant including an air-permeable conduit carried by said frame and in communication with said cylinder to receive air each time the cylinder is actuated, the air in said conduit issuing therefrom as discrete bubbles which rise through the liquid, and burst at the coolant surface to agitate the liquid to wet the waste with the coolant at the coolant surface, thereby causing the waste to sink below the surface and onto said filter element for cleaning therefrom by said scraper.

6. A filtration system for the removal of relatively light metal machining waste floating on the surface of liquid coolant disposed in a tank by submerging the waste below the surface, comprising a frame, a filter element carried by said frame for periodic actuation, a cylinder for periodically actuating said filter element, a scraper carried by the frame, the element and scraper being immersed in the tank of liquid coolant, means for causing the floating waste to sink from the surface of coolant including an air-permeable conduit carried by said frame and means for introducing air into said conduit for issuance therefrom as discrete bubbles which rise through the liquid and burst at the coolant surface to agitate the liquid at its surface to wet the surface of the waste with the coolant at the coolant surface, thereby causing the waste to sink below the surface and onto said filter element for cleaning therefrom by said scraper.

* * * * *